United States Patent
Darling

(10) Patent No.: US 10,096,852 B2
(45) Date of Patent: Oct. 9, 2018

(54) GAS PURGE CONTROL FOR COOLANT IN A FUEL CELL

(71) Applicant: Audi AG, Ingolstadt (DE)

(72) Inventor: Robert M. Darling, South Windsor, CT (US)

(73) Assignee: Audi AG, Ingolstadt (DE)

( * ) Notice: Subject to any disclaimer, the term of this patent is extended or adjusted under 35 U.S.C. 154(b) by 314 days.

(21) Appl. No.: 14/823,819

(22) Filed: Aug. 11, 2015

(65) Prior Publication Data
US 2015/0349363 A1    Dec. 3, 2015

Related U.S. Application Data

(63) Continuation of application No. 12/517,404, filed as application No. PCT/US2006/049636 on Dec. 29, 2006, now abandoned.

(51) Int. Cl.
| | | |
|---|---|---|
| H01M 8/06 | (2016.01) | |
| H01M 8/0438 | (2016.01) | |
| H01M 8/0267 | (2016.01) | |
| H01M 8/04119 | (2016.01) | |
| H01M 8/04291 | (2016.01) | |
| H01M 8/04746 | (2016.01) | |

(52) U.S. Cl.
CPC ..... *H01M 8/04417* (2013.01); *H01M 8/0267* (2013.01); *H01M 8/04134* (2013.01); *H01M 8/04164* (2013.01); *H01M 8/04291* (2013.01); *H01M 8/04761* (2013.01)

(58) Field of Classification Search
CPC .......... H01M 8/04417; H01M 8/0267; H01M 8/04164; H01M 8/04761; H01M 8/04134; H01M 8/04291

USPC .................................................. 429/413, 434
See application file for complete search history.

(56) References Cited

U.S. PATENT DOCUMENTS

| | | | | |
|---|---|---|---|---|
| 6,015,634 A | * | 1/2000 | Bonville, Jr. | H01M 8/04029 429/415 |
| 6,159,629 A | * | 12/2000 | Gibb | H01M 8/04089 429/428 |
| 2006/0035120 A1 | * | 2/2006 | Sakai | H01M 8/04126 429/413 |
| 2006/0141331 A1 | * | 6/2006 | Reiser | H01M 8/0258 429/414 |

OTHER PUBLICATIONS

International Preliminary Report on Patentability dated Apr. 29, 2010, for corresponding International Application No. PCT/US2006/049636, 7 pages.
International Search Report and Written Opinion dated Apr. 23, 2008, for corresponding International Application No. PCT/US2006/049636, 10 pages.

* cited by examiner

*Primary Examiner* — Gary D Harris
(74) *Attorney, Agent, or Firm* — Seed Intellectual Property Law Group LLP

(57) ABSTRACT

A fuel cell includes a water transport plate providing a water flow field. The water flow field permits a flow of water having an entrained gas. A vent is in fluid communication with the water flow field. At least some of the gas is released from fuel cell by opening a vent. In a disclosed example, a valve is opened in response to conditions indicative of an undesired amount of gas. For example, the valve is actuated in response to a signal from a water level sensor. In another example, the valve is opened based upon a schedule.

14 Claims, 1 Drawing Sheet

GAS PURGE CONTROL FOR COOLANT IN A FUEL CELL

BACKGROUND

Technical Field

This application generally relates to fuel cells, and more particularly, the application relates to managing gases within a fuel cell.

Description of the Related Art

A fuel cell uses a cathode and anode that receive oxidant, such as air, and fuel, such as hydrogen, respectively, to generate an electrochemical reaction that produces electricity, as is well known. Typically, the cathode and anode are separated by a solid separator plate which prevents commingling of reactant gases but provides for electrical conductivity. The fuel cell typically includes numerous cells that form a stack. The cells may include water transport plates, which are porous separator plates through which water passes, but not appreciable quantities of gas. The water transport plate is hydrated by a water flow field on one side, the water flowing through the plate to humidify the reactant stream (fuel or oxidant) on the other side. The humidified reactant stream permits membrane hydration, which is important to successful operation of the fuel cell. The water transport plate also enables removal of product water which is generated on the cathode by the electrochemical reaction. In some example fuel cells, the circulated water acts as a coolant.

The volume of water within the stack must be managed to maintain a desired amount of water, for example, for membrane hydration, cell cooling, and minimizing the effects of sub-freezing environments. In one type of cooling system, water is evaporated into a cathode reactant flow field and then condensed in an external device to return liquid water to the fuel cell's water flow field. Systems employing evaporatively cooled fuel cells have far less water than similar fuel cells using other types of cooling strategies. However, gases may become entrained in the coolant passages due to leakage from ambient surroundings, or reactant crossover through the seals or the pores of the water transport plates, on the order of one cubic centimeter per minute per cell in the stack in one example. Entrained gases inhibit the replenishment of liquid water to the water flow field, which can cause operational problems with the fuel cell. The gases must be expelled from the fuel cell to maintain desired operation of the fuel cell.

What is needed is a method and apparatus of releasing gases from the coolant passages of the fuel cell.

BRIEF SUMMARY

A fuel cell includes a separator plate providing a coolant flow field. The coolant flow field receives condensed water from the cathode exhaust. The coolant channels, which may be dead-ended, permit water to pass through the anode water transport plate whereupon it humidifies the membrane and is subsequently evaporated into the cathode reactant stream to control the temperature of the fuel cell. The coolant flow field has undesired entrained gas. A vent is in fluid communication with the coolant flow field. The gas is released from the fuel cell by opening the vent. The vent is opened in response to conditions indicative of an undesired amount of gas. In one example, a valve that is normally closed is actuated to open in response to a signal from a coolant level sensor. In another example, the vent is opened based upon a schedule.

Accordingly, gases can be released from the fuel cell to avoid gas build up.

These and other features can be best understood from the following specification and drawings, the following of which is a brief description.

DETAILED DESCRIPTION OF THE PREFERRED EMBODIMENT

Figure 1:
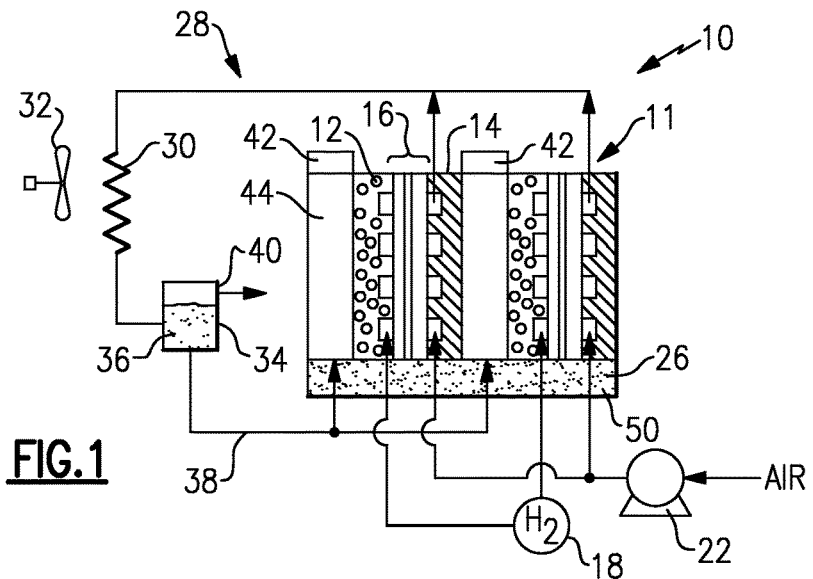
FIG. 1 is schematic view of a fuel cell arrangement including an evaporative cooling loop.

FIG. 1 schematically illustrates a fuel cell 10 that includes an anode 12 and a cathode 14. The anode 12 receives fuel, such as hydrogen, from a fuel source 18. The cathode 14 receives an oxidant, such as air, from a source such as a blower 22. The oxidant chemically reacts with the fuel in an electrode assembly 16 that is arranged between the cathode and anode 14, 12. The anode, cathode and electrode assembly 12, 14, 16 provide a cell 11. Multiple cells 11 (only two shown) are arranged to provide a stack. Electrically conductive separator plates 44 are used to separate individual cells.

A separator plate 44 configured as a water transport plate comprises a water flow field 24 (FIG. 2) in fluid communication with the anode and cathode 12, 14 of each cell. In this example, at least a portion of the water transport plate 44 for at least one of the cathode 14 or anode 12 is porous. The water flow fields 24 are fluidly connected to one another by a coolant manifold 20 (shown schematically in FIGS. 3 and 4). The water flow fields may be dead-ended such that no liquid water is circulated through the system, and the only movement of water is to replenish that which has evaporated. Water 50 within the water flow field 24 hydrates the water transport plates 44. An accumulator 26 is also filled with water to ensure that the fuel cell 10 has a desired volume of water for desired operation of the fuel cell 10.

In another example, the water flow field is replaced by a coolant flow field 24 wherein the coolant contains a percentage of water in a low vapor pressure carrier, and the percentage of water is sufficient to evaporatively cool the cell.

In yet another example, one of the separator plates is solid. One side of the solid separator plate has reactant flow fields; the other side has a coolant flow field allowing water to humidify the adjacent reactant flow field through the adjacent porous plate.

Water passes through the water transport plate 44, humidifies the reactant stream, and hydrates the membrane in the electrode assembly 16. Water formed by the electrochemical reaction on the cathode side of the electrode assembly 16, as well as water passing through the membrane by osmotic drag, is evaporated into the cathode reactant stream of the cathode 14 on the opposite side of the water flow field 24. Oxidant pumped through the reactant flow field increases in temperature and becomes saturated as it receives the evaporated water vapor. A cathode exhaust loop 28 receives cathode exhaust (substantially depleted of oxygen) with water vapor, and the water vapor is condensed with a condenser 30 and fan 32, or a similar arrangement. Liquid water 36 is collected in a separator 34 and some of the gases are vented through an exit 40 in the separator 34. A return line 38 supplies the liquid water 36 back to the water flow field 24 of the fuel cell 10.

Figure 2:
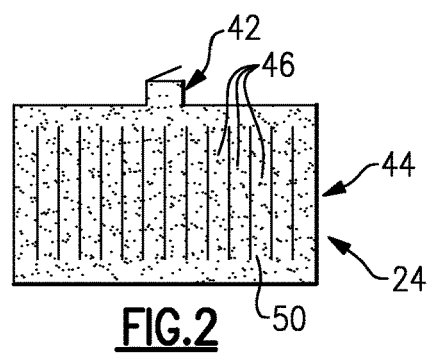
FIG. 2 is a schematic view of a coolant flow field with a vent.

Referring to FIG. 2, an example water transport plate 44 is shown having channels 46 that direct water through the coolant flow field 24. Gas bubbles migrate to a vent 42 in the coolant exit of manifold 20 (FIGS. 3 and 4), which may have transparent portions for viewing the water level. The coolant manifold 20 communicates with the water transport plates 44 associated with each cell in the fuel cell 10. The gases accumulate during operation of the fuel cell 10 and must be frequently released to the atmosphere.

Figure 3:
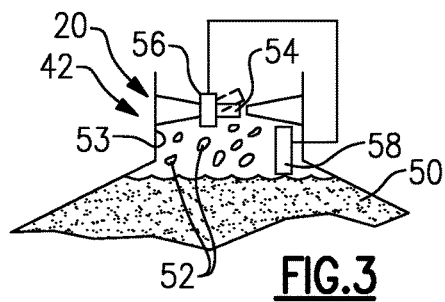
FIG. 3 is a schematic view of the vent shown in FIG. 2 with a control valve arranged in the vent and actuated in response to a level sensor to release gas and retain coolant.

Referring to FIG. 3, an example is shown in which a valve 54 is actuated to release the gases 52 to atmosphere in response to a signal from a level sensor 58. The valve 54 normally blocks a passage 53 in communication with the coolant manifold 20. The closed position is shown in solid lines in FIGS. 3 and 4, and the open position is shown in dashed lines. As the coolant level rises to a predetermined level, the level sensor 58 sends a signal to an actuator 56 to briefly open the valve 54, which releases the gases that have collected in the coolant manifold 20. In this manner, undesired gas build up is avoided.

Figure 4:
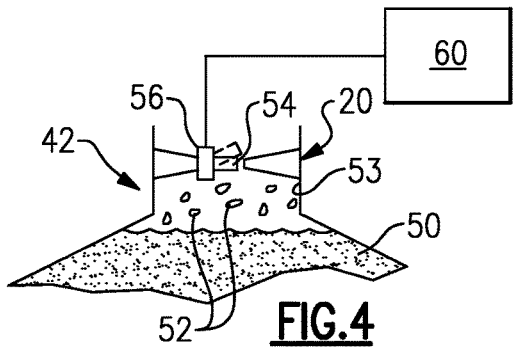
FIG. 4 is a schematic view of the vent shown in FIG. 2 with the control valve arranged in the vent and actuated in response to a controller to release gas and retain coolant.

Another example embodiment is shown in FIG. 4. FIG. 4 illustrates an arrangement in which the valve 54 is periodically opened based upon a schedule. A controller 60 contains information based upon one or more characteristics that are indicative of gas build up in the fuel cell 10. A schedule can be determined from these characteristics and used to open the valve 54 using the actuator 56. In one example, fuel cell operating time is used to actuate the valve 54. In another example, the valve 54 is opened at preset intervals.

Although several example embodiments have been disclosed, a worker of ordinary skill in this art would recognize that certain modifications would come within the scope of the claims. For that reason, the following claims should be studied to determine their true scope and content.

The invention claimed is:

1. A fuel cell, comprising:
a fluid transport plate having a closed coolant flow field in fluid communication with a vent opening;
a coolant manifold coupled to the vent opening of the fluid transport plate and including a passageway, the vent opening being positioned in the passageway;
a sensor positioned in the passageway of the coolant manifold, the sensor configured to detect a level of a coolant in the fluid transport plate; and
a valve positioned in the passageway of the coolant manifold and coupled to the sensor, the valve being configured to seal and unseal the vent opening in response to a signal from the sensor, the valve being configured to open to release excess gas from the fluid transport plate.

2. The fuel cell of claim 1 wherein the closed coolant flow field includes a plurality of parallel channels that extend from the vent opening to a sealed end.

3. The fuel cell of claim 1, further comprising a cathode exhaust loop in fluid communication with the coolant flow field.

4. The fuel cell of claim 3 wherein the cathode exhaust loop includes a condenser, a separator, and a return line configured to supply liquid water to the coolant flow field.

5. The fuel cell of claim 1 wherein the closed coolant flow field is dead-ended.

6. A system, comprising:
an anode;
a cathode adjacent to the anode;
a fluid transport plate in fluid communication with the anode and the cathode, the fluid transport plate having a closed coolant flow field in fluid communication with a vent opening;
a coolant manifold coupled to the vent opening of the fluid transport plate and including a passageway, the vent opening being positioned in the passageway;
a sensor positioned in the passageway of the coolant manifold;
a valve positioned in the passageway of the coolant manifold; and
a controller coupled to the valve, the controller configured to control the valve to seal and unseal the vent opening to release excess gas from the fluid transport plate.

7. The system of claim 6 wherein the controller is configured to open the valve periodically.

8. The system of claim 6 wherein the controller is configured to open the valve in response to a signal from a sensor.

9. The system of claim 8 wherein the fluid transport plate includes a plurality of parallel channels.

10. A system, comprising:
an anode;
a cathode;
a fluid transport plate in fluid communication with the anode and the cathode, the fluid transport plate having a closed coolant flow field in fluid communication with a vent opening;
a coolant manifold coupled to the vent opening of the fluid transport plate and including a passageway, the vent opening being positioned in the passageway;
a valve positioned in the passageway of the coolant manifold;
a sensor positioned in the passageway of the coolant manifold and coupled to the valve; and
a cathode exhaust loop coupled to the cathode.

11. The system of claim 10 wherein the cathode exhaust loop includes a condenser coupled between the cathode and the fluid transport plate.

12. The system of claim 11 wherein the cathode exhaust loop includes a separator coupled to the condenser, the separator configured to collect fluid from the condenser.

13. The system of claim 12 wherein the separator is coupled to the fluid transport plate and is configured to provide fluid from the separator to the flow field.

14. The fuel cell of claim 1, further comprising:
an actuator positioned in the coolant manifold and operably coupled to the valve, the actuator configured to open and close the valve, the opening and closing of the valve respectively sealing and unsealing the vent opening.

* * * * *